United States Patent
Williams

(10) Patent No.: US 10,482,402 B2
(45) Date of Patent: Nov. 19, 2019

(54) METHOD AND SYSTEM FOR PROVIDING NOTIFICATIONS RELATED TO SERVICE INFORMATION OF MACHINE

(71) Applicant: Caterpillar Inc., Peoria, IL (US)

(72) Inventor: Jamin T. Williams, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 150 days.

(21) Appl. No.: 15/682,875

(22) Filed: Aug. 22, 2017

(65) Prior Publication Data
US 2019/0066004 A1 Feb. 28, 2019

(51) Int. Cl.
*G06Q 10/06* (2012.01)
*G07C 5/00* (2006.01)
*G08G 1/00* (2006.01)

(52) U.S. Cl.
CPC ............ *G06Q 10/06* (2013.01); *G07C 5/008* (2013.01); *G08G 1/205* (2013.01)

(58) Field of Classification Search
CPC ......... B60Q 10/06; G07C 5/008; G08G 1/205
USPC .......................................................... 701/29
See application file for complete search history.

(56) References Cited

U.S. PATENT DOCUMENTS

| | | |
|---|---|---|
| 6,330,499 B1 | 12/2001 | Chou et al. |
| 6,920,382 B2 | 7/2005 | Katagishi et al. |
| RE39,845 E | 9/2007 | Hasfjord et al. |
| 8,060,274 B2 | 11/2011 | Boss et al. |
| 9,053,588 B1 | 6/2015 | Briggs et al. |
| 9,363,646 B2 | 6/2016 | Mauti, Jr. |
| 9,849,044 B1 * | 12/2017 | Groden .................. A61G 3/001 |
| 2006/0136105 A1 | 6/2006 | Larson |
| 2009/0237253 A1 | 9/2009 | Neuwirth |
| 2009/0327102 A1 | 12/2009 | Maniar et al. |
| 2010/0304787 A1 | 12/2010 | Lee et al. |
| 2013/0317732 A1 | 11/2013 | Borg et al. |
| 2015/0339948 A1 | 11/2015 | Wood et al. |
| 2016/0364718 A1 * | 12/2016 | Betancourt ........ G06Q 20/3278 |
| 2016/0379484 A1 * | 12/2016 | Kashiwai ............. G08G 1/0112 340/933 |
| 2017/0140237 A1 * | 5/2017 | Voeller ................... G06K 9/033 |

FOREIGN PATENT DOCUMENTS

WO 2017053046 3/2017

* cited by examiner

*Primary Examiner* — Marthe Y Marc-Coleman
(74) *Attorney, Agent, or Firm* — Oblon, McClelland, Maier & Neustadt

(57) ABSTRACT

A method for providing notifications related to service information of a machine located at a worksite is provided includes detecting, by a worksite management system, an entry of the machine in a first predefined service zone based on machine location data and machine identification data. The first predefined service zone is defined in the worksite management system corresponding to a first service area at the worksite. The method also includes generating, by the worksite management system, a first notification based on at least one predefined parameter and the machine identification data upon the entry of the machine in the first predefined service zone. The first notification includes information related to a service to be performed at the first service area. The method further includes detecting, by the worksite management system, an exit of the machine from the first predefined service zone based on the machine location data.

20 Claims, 3 Drawing Sheets

METHOD AND SYSTEM FOR PROVIDING NOTIFICATIONS RELATED TO SERVICE INFORMATION OF MACHINE

TECHNICAL FIELD

The present disclosure relates to a method and a system for providing notifications related to service information of a machine located at a worksite.

BACKGROUND

Machines operating at a worksite require servicing at periodic intervals. The servicing of each component must be performed while taking into consideration certain protocols, which may be provided via a maintenance table of the machine. Further, some services performed on the machine will result in a recommended subsequent service procedure. For example, a service such as a rear tire change of a particular machine may result in a recommendation for calibration of the machine.

Currently, service related decisions and actions may be made by relying on knowledge of service personnel of the maintenance tables relating to that particular machine. The service personal must refer to the maintenance table to determine the protocols to be followed before performing the servicing and/or whether a subsequent service procedure needs to be performed on the machine. This process is cumbersome and relies on the service personnel's knowledge of recent maintenance or service performed on the machine and understanding of the maintenance table. It is possible that service personnel may misinterpret the maintenance tables, and hence the recommended protocols may not be followed and the subsequent service procedures may not be performed on the machine, which is not desirable.

U.S. Pat. No. 8,060,274 describes systems, methods, and program products for scheduling vehicle maintenance. The vehicle maintenance is scheduled by identifying a future location at which a vehicle is available for a service and electronically providing at least the future location, a time and time duration that the vehicle is estimated to be at the future location, and an identified service, to a mechanic.

SUMMARY OF THE DISCLOSURE

In one aspect of the present disclosure, a method for providing notifications related to service information of a machine located at a worksite is provided. The method includes detecting, by a worksite management system, an entry of the machine in a first predefined service zone based on machine location data and machine identification data. The first predefined service zone is defined in the worksite management system corresponding to a first service area at the worksite. The method also includes generating, by the worksite management system, a first notification based on at least one predefined parameter and the machine identification data upon the entry of the machine in the first predefined service zone. The first notification includes information related to a service to be performed at the first service area. The method further includes detecting, by the worksite management system, an exit of the machine from the first predefined service zone based on the machine location data.

In another aspect of the present disclosure, a system for providing notifications related to service information of a machine located at a worksite is provided. The system includes a worksite management system having a first predefined service zone. The first predefined service zone is defined in the worksite management system corresponding to a first service area at the worksite. The worksite management system is configured to detect an entry of the machine in the first predefined service zone based on machine location data and machine identification data. The worksite management system is also configured to generate a first notification upon the entry of the machine in the first predefined service zone. The first notification includes information related to a service to be performed at the first service area. The worksite management system is further configured to detect an exit of the machine from the first predefined service zone based on the machine location data. The worksite management system is configured to generate a second notification after detecting the exit of the machine from the first predefined service zone. The second notification includes information related to a subsequent service to be performed on the machine. The system further includes a user equipment communicably coupled to the worksite management system. The user equipment is configured to display the first and second notifications received from the worksite management system.

In yet another aspect of the present disclosure, a computer program product embodied in a computer for providing notifications related to service information of a machine located at a worksite is provided. The computer program product causing the computer to perform operations includes detecting, by the worksite management system, an entry of a machine in a first predefined service zone based on machine location data and machine identification data. The first predefined service zone is defined in the worksite management system corresponding to a first service area at the worksite. The computer program product causing the computer to perform operations also includes generating, by the worksite management system, a first notification based on at least one predefined parameter and the machine identification data upon the entry of the machine in the first predefined service zone. The first notification includes information related to a service to be performed at the first service area. The computer program product causing the computer to perform operations further includes detecting, by the worksite management system, an exit of the machine from the first predefined service zone based on the machine location data. The computer program product causing the computer to perform operations includes generating a second notification, by the worksite management system, after detecting the exit of the machine from the first predefined service zone. The second notification includes information related to a subsequent service to be performed on the machine.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
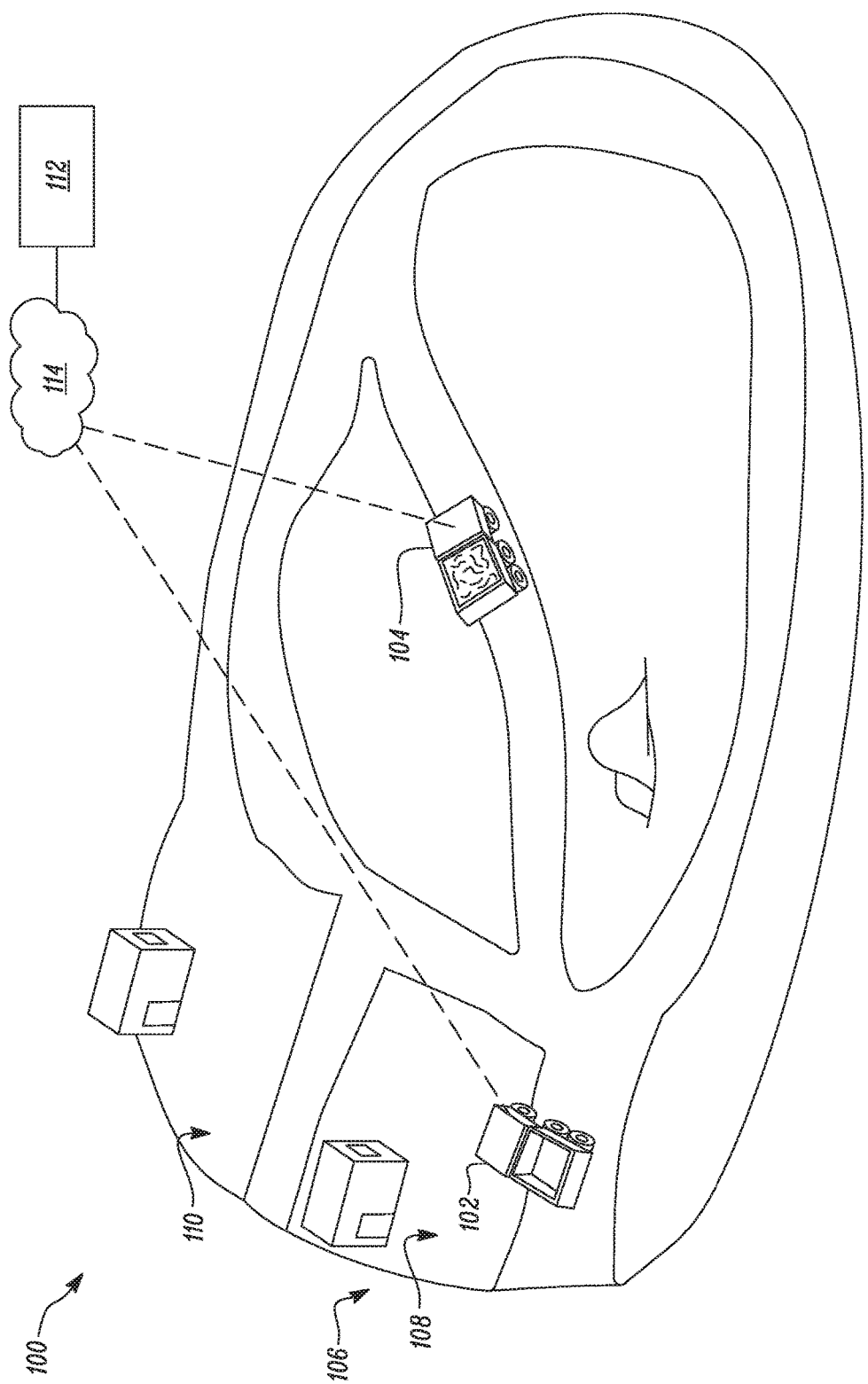
FIG. 1 is a schematic view of an exemplary worksite including a number of service areas and machines, according to an embodiment of the present disclosure.

FIG. 1 illustrates a schematic view of an exemplary worksite 100. A number of different machines 102, 104 may operate at the worksite 100 to perform various operations, such as loading and unloading of payload, earth moving, excavation, and the like. Although the machines 102, 104 described in connection with this disclosure are embodied as dump trucks, the machines 102, 104 may alternatively include any other type of same or different machines, without any limitations. Further, a number of machines operating at the worksite 100 may vary based on the operations performed at the worksite 100. The machines 102, 104 may be embodied as autonomous or semi-autonomous machines that are remotely controlled by operators seated at a remote operator station (not shown). In another example, the machines 102, 104 may be manually operated by operators seated within operator cabins of the respective machines 102, 104.

The machines 102, 104 include one or more common machine components such as an engine, tires, a frame, a brake system, a transmission system, and the like. The machine components are subjected to wear and tear during the operation of the machines 102, 104. The machine components are serviced at regular intervals to reduce downtime. Hence, a number of service areas 106 may be present at the worksite 100 for servicing the machines and machine components. Further, the service areas 106 may include, but are not limited to, a tire service area, an engine service area, a welding area, and a frame service area. The worksite 100 may also include a calibration service area for performing calibration of a positioning system of the machines 102, 104, without any limitations. The service areas 106 may include service equipment and service set-ups that allow servicing of the machine components, without limiting the scope of present disclosure. It is contemplated that a total number of service areas at the worksite 100 may vary based on the machines 102, 104 that operate at the worksite 100. However, for the purpose of simplicity only two service areas, namely a first service area 108 and a second service area 110 are illustrated in the accompanying figures.

Further, the machines 102, 104 may include a number of sensors (not shown) for detecting various parameters of the respective machines 102, 104. For example, the machines 102, 104 may include sensors for detecting a location of the respective machines 102, 104 at the worksite 100. Each of the machines 102, 104 may further include a communication unit (not shown). The communication unit transmits and receives data associated with the machines 102, 104 over a network 114. Examples of the network 114 may include, but are not limited to, a wide area network (WAN), a local area network (LAN), an Ethernet, an internet, an intranet, a cellular network, a satellite network, or any other known network for transmitting and receiving data. In various embodiments, the network 114 may include a combination of two or more of the aforementioned networks and/or other types of networks known in the art.

Figure 2:
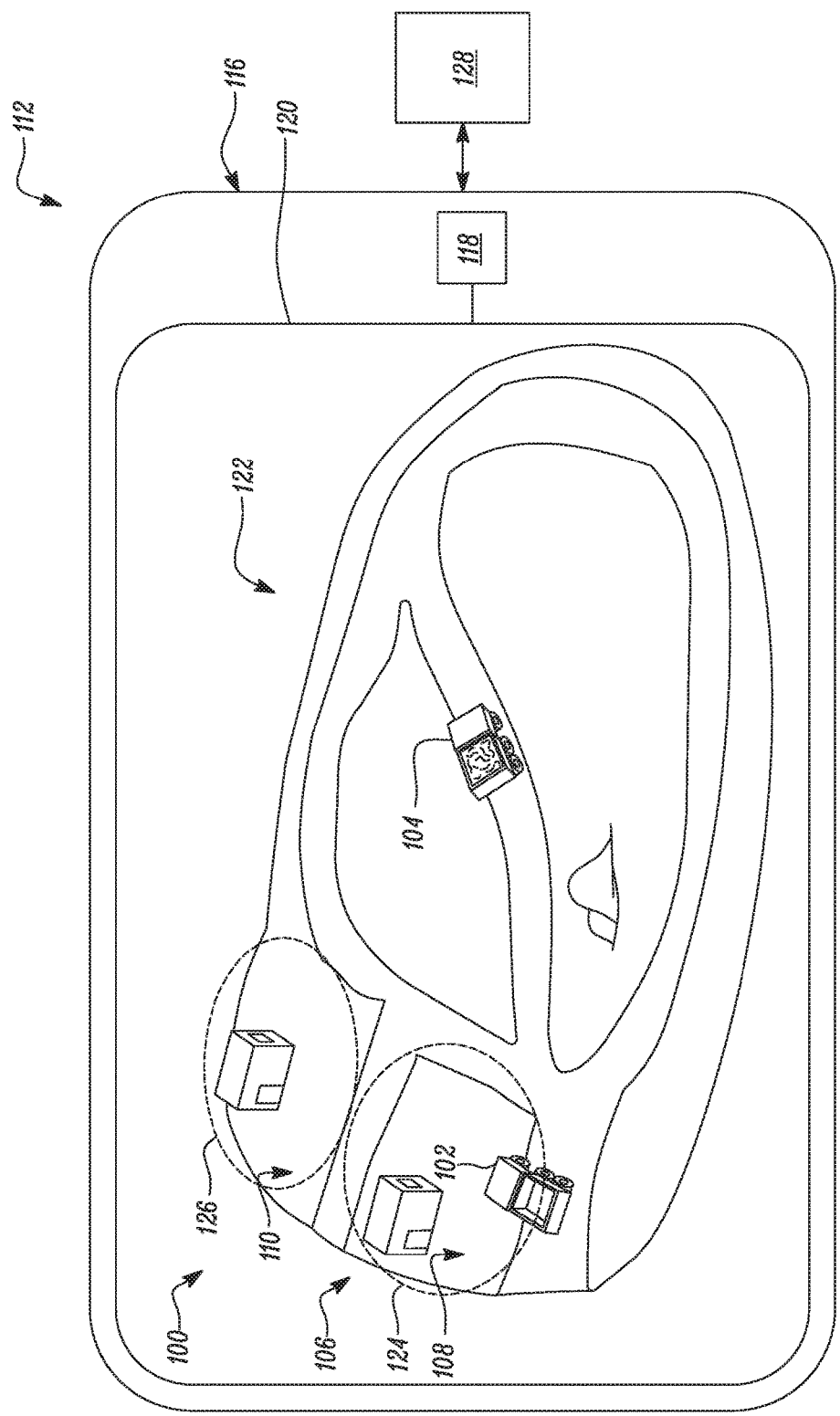
FIG. 2 is a block diagram of a system for providing notifications related to service information for the machine located at the worksite of FIG. 1, according to an embodiment of the present disclosure.

In one example, the communication unit communicates the machine parameters detected by the sensors to a system 112. The system 112 provides notifications related to service information for the machines 102, 104 located at the worksite 100. Referring to FIG. 2, a block diagram of the system 112 is shown. The system 112 includes a worksite management system 116 and a user equipment 128. The worksite management system 116 may embody a fleet management system. The worksite management system 116 may be an open fleet management system and/or an underground fleet management system, without any limitations. It may be further noted that the worksite management system 116 may embody any one of a terrain management system, a machine detection system, an autonomous machine control system, a semi-autonomous machine control system, and so on. It may be understood that the worksite management system 116 disclosed herein may be distinct for different worksites with respect to architecture, data storage capabilities, type of data stored therein, data formats, and may have distinct system implementation and functionality.

The worksite management system 116 may store information related to the machines 102, 104 that are operating at the worksite 100, and may be used for asset management and for providing an interface for controlling or accessing information related to the operation of the machines 102, 104 from a remote location. The worksite management system 116 may gather the data regarding the machines 102, 104, manage and interpret data related to machine maintenance, understand how and when to service the machines 102, 104, and the like.

In one embodiment, the worksite management system 116 collects data related to the worksite 100, the data related to the machines 102, 104, data related to the first and second service areas 108, 110, or a combination thereof. The worksite management system 116 may include a data storage unit 118 for storing the data collected from various sources. The data storage unit 118 may also store personnel information related to crew or designated work staff operating the machines 102, 104, service personnel appointed at the first and second service areas 108, 110, and the like.

Further, the data storage unit 118 stores maintenance protocols associated with each of the machines 102, 104 deployed at the worksite 100. The maintenance protocols may include a maintenance table of the machine 102, 104. For example, the maintenance protocol associated with the brake system of the machine 102 may include disconnecting a brake Electronic Control Module (ECM) connection before initiating servicing of the brake system of the machine 102.

The worksite management system 116 may also receive machine identification data associated with the machines 102, 104. The machine identification data may be stored in the data storage unit 118. In one example, the machine identification data is a machine ID. The machine identification data may be unique information associated with the respective machine 102, 104, and provides information regarding a type of the machine 102, 104, year of manufacturing, a type of engine associated with the respective machines 102, 104, and the like. The worksite management system 116 may further include a display unit 120, without any limitations. The display unit 120 displays a virtual map 122 of the worksite 100 and the data stored in the data storage unit 118. The virtual map 122 of the worksite 100 may assist in monitoring the worksite 100 in real time.

Further, a number of predefined service zones may be defined in the worksite management system 116 corresponding to each of the service areas 106 at the worksite 100. The predefined service zones are depicted in the virtual map 122 of the worksite 100. More particularly, a first predefined service zone 124 is defined in the worksite management system 116 corresponding to the first service area 108 and a second predefined service zone 126 is defined in the worksite management system 116 corresponding to the second service area 110. In order to define the first and second predefined service zones 124, 126, the worksite management system 116 determines location coordinates of the first and second service areas 108, 110. Based on the location coordinates, the first and second predefined service zones 124, 126 are defined on the virtual map 122 of the worksite 100 that is displayed on the display unit 120.

For explanatory purposes, the system 112 will now be explained in reference to providing the notifications related to the service information of the machine 102. However, it should be noted that the system 112 may also provide the notifications related to the service information of the machine 104 and/or any other machines located at the worksite 100, without limiting the scope of the present disclosure.

In a situation where the machine 102 requires servicing, an operator or a personnel in-charge of the machine 102 may drive the machine 102 to one of the service areas 106. For example, the machine 102 may enter the first service area 108 so that a particular service can be performed on the machine 102. For exemplary purposes, the present disclosure will be described in relation to the servicing of the machine 102 at the first service area 108. However, it should be noted that the details provided below is equally applicable to each of the services areas 106 at the worksite 100.

The worksite management system 116 detects an entry of the machine 102 in the first predefined service zone 124 based on the machine location data obtained from the machine 102 and the machine identification data. Further, the worksite management system 116 retrieves the machine protocols for the machine 102 that are predefined in the data storage unit 118.

Further, the worksite management system 116 coordinates the machine protocols and one or more predefined parameters. One of the predefined parameters may include a type of the machine 102. For example, the machine 102 may embody at least one of an excavator, a dump truck, a passenger vehicle, and the like. The predefined parameters may also include a type of the service area 106. The predefined parameters may further include a type of the service to be performed on the machine 102 at the first service area 108. For example, the first service area 108 may include the tire service area that may perform various tire services, such as, change of rear tires of the machine 102.

The worksite management system 116 coordinates the maintenance protocols and the predefined parameters, such as the type of the machine 102, the type of the first service area 108, and the type of the service performed at the first service area 108. Further, the worksite management system 116 generates a first notification based on the coordination of the maintenance protocols and the predefined parameters. The first notification includes information related to the service that needs to be performed on the machine 102 at the first service area 108.

In one example, when the first service area 108 is the tire service area, the worksite management system 116 may detect that the machine 102 is entering the first service area 108 and generate the first notification. In such an example, the first notification may notify the operator or the personnel if the machine 102 is scheduled for a tire change procedure. Further, if the machine 102 is scheduled for the tire change procedure, the first notification may also include information related to the maintenance protocols that are to be considered before initiating the tire change procedure.

In another example, when the first service area 108 is the welding area, the worksite management system 116 detects that the machine 102 is entering the first service area 108 and generates the first notification. In such a situation, the first notification may notify the operator or the personnel that a welding process is to be performed on the frame of the machine 102. The first notification may also include information related to the maintenance protocols that are to be considered before initiating the welding process on the frame. For example, the maintenance protocol may include disconnecting the sensors attached to the frame of the machine 102 before performing any welding process on the frame.

Further, the worksite management system 116 also detects an exit of the machine 102 from the first predefined service zone 124 based on the machine location data. The worksite management system 116 also generates a second notification after detecting the exit of the machine 102 from the first service area 108. The second notification includes information related to a subsequent service to be performed on the machine 102. The worksite management system 116 determines the subsequent service to be performed on the machine 102. The worksite management system 116 generates the second notification based on the maintenance protocols associated with the machine 102 and the service that was performed on the machine 102 at the first service area 108.

In the example, where the first service area 108 is the tire service area and the type of the service performed is the change of the rear tires of the machine 102, the machine 102 may have to undergo a subsequent service such as calibration of the positioning system of the machine 102. Further, in one example, the second notification may inform the operator or the personnel that the subsequent service needs to be performed at the second service area 110. Accordingly, based on the receipt of the second notification, the machine 102 may enter the second predefined service zone 126 corresponding to the second service area 110 to perform the subsequent service.

As mentioned earlier, the system 112 includes the user equipment 128. The user equipment 128 is communicably coupled to the worksite management system 116. The user equipment 128 receives and displays the first notification and the second notification generated by the worksite management system 116. In the illustrated example, the user equipment 128 is associated with all the service areas 106 of the worksite 100, and hence the first and second notifications may be sent to the user equipment 128. Although, only a single user equipment 128 is described with reference to the system 112, the worksite management system 116 may be communicably coupled to any number of user equipment, based on the type of the worksite 100. More particularly, a separate user equipment may be associated with each of the service areas 106 of the worksite 100. For example, a first user equipment may be associated with the first service area 108, a second user equipment may be associated with the second service area 110, and so on.

It may be contemplated that the user equipment 128 may be in possession of the personnel present at the service areas 106. In another example, the user equipment 128 may be a user interface having a display unit located in the operator cabin of the machine 102. In yet another example, the user equipment 128 may be in possession of a worksite manager located at a remote location. The user equipment 128 may have a display interface (not shown) which may include a touch sensitive display. The user equipment 128 may display the first and second notifications via at least one of a Short Message Service (SMS), a voice alert, a Multimedia Message Service (MMS), a poll notification, an Electronic Mail (e-mail), and the like. In an example, the user equipment 128 may be a portable computing device that operates using a portable power source such as a battery. Examples of the portable computing device may include, but are not limited to, a mobile phone, a smart phone, a palm top, a tablet, a laptop, and the like.

Additional or alternatively, the user equipment 128 may provide audio notifications. In such an example, the user equipment 128 may receive and store an audible data or a voice alert. The user equipment 128 may also include a speaker to output the audible data or the voice alert.

The user equipment 128 may also allow the personnel to update the information regarding the services performed at the service areas 106 on the worksite management system 116. More particularly, the worksite management system 116 may send a prompt to the user equipment 128 to enter the information related to the service performed on the machine 102 when the machine 102 exits any one of the service areas 106. For example, the worksite management system 116 may send a prompt to the user equipment 128 to enter the information related to the service performed on the machine 102 at the first service area 106 or the subsequent service performed on the machine 102 at the second service area 110. The personnel may enter the information related to the service and the subsequent service via the user equipment 128. The information entered by the personnel may be stored in the data storage unit 118 of the worksite management system 116. In some examples, the worksite management system 116 retrieves the information stored at the data storage unit 118 related to the services performed at the service areas 106 to generate the notifications related to the service information, without any limitations.

It is to be understood that features of the present disclosure may be combined with individual features shown or described in another embodiment of the present disclosure. The above described implementation does not in any way limit the scope of the present disclosure. Therefore, it is to be understood that although some features are shown or described to illustrate the use of the present disclosure in the context of functional segments such as various system of present disclosure, such features may be omitted from the scope of the present disclosure without departing from the scope of the present disclosure as defined in the appended claims.

INDUSTRIAL APPLICABILITY

The present disclosure relates to the system 112 and a method 300 for providing the notifications related to the service information for the machine 102, 104 located at the worksite 100 with high integrity. The worksite management system 116 of the system 112 generates the first notification including the information related to the service to be performed on the machine 102, 104 at the first service area 108. The worksite management system 116 also generates the second notification including the information related to the subsequent service to be performed on the machine 102, 104 at the second service area 110. The worksite management system 116 generates the first and second notifications based on the maintenance protocols of the respective machine 102, 104. Hence, the personnel at the first and second service areas 108, 110 need not refer the maintenance tables for initiating and performing the servicing of the machines components, thereby reducing time required for the servicing of the machine components.

Further, the first and second notifications provide accurate maintenance protocols related to the servicing of each machine component, thereby reducing a possibility of failure and/or damage of the machine components while performing the servicing thereon. The worksite management system 116 may also prompt the personnel to enter the information related to the service performed on the machines 102, 104 at any one of the service areas 106. This enables the worksite management system 116 to maintain an updated track record related to the servicing of the machines 102, 104.

The system 112 and the method 300 allow reliable servicing of the machine components. Further, the worksite management system 116 may recommend subsequent services to be performed on the machines 102, 104 after a particular service is performed on the machines 102, 104. The first and second notifications assists in reducing downtime of the machines 102, 104 and expediting the servicing at the service areas 106 by providing the service information handy to the personnel in-charge of performing the servicing.

Further, the system 112 may be embodied as a computer program product in a computer. The computer program product is enabled to provide the notifications related to the service information of the machines 102, 104 located at the worksite 100.

Figure 3:
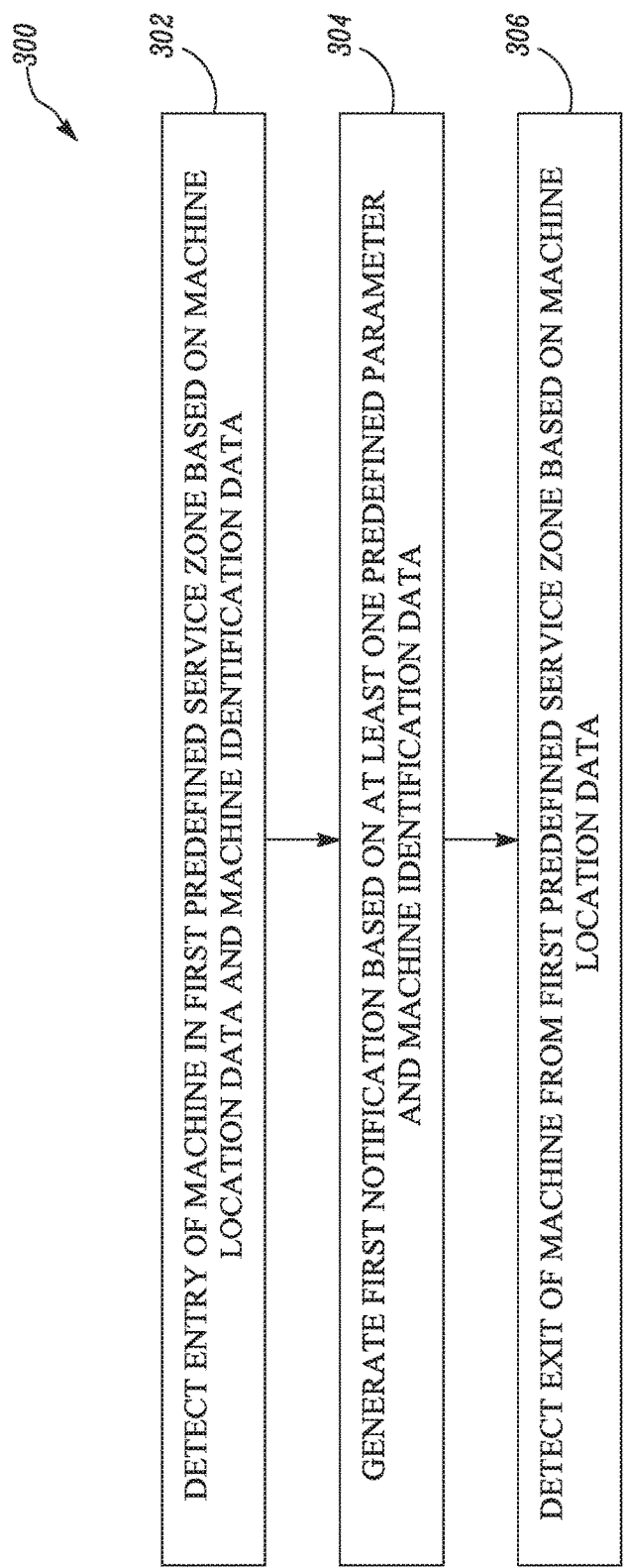
FIG. 3 is a flowchart of a method for providing the notifications related to the service information for the machine located at the worksite, according to an embodiment of the present disclosure.

FIG. 3 is a flowchart of the method 300 for providing the notifications related to the service information for the machine 102, 104 located at the worksite 100. At step 302, worksite management system 116 detects the entry of the machine 102, 104 in the first predefined service zone 124. The first predefined service zone 124 is defined in the worksite management system 116 corresponding to the first service area 108 at the worksite 100. It may be noted that the number of predefined service zones are defined in the worksite management system 116 corresponding to the service areas 106 at the worksite 100. The worksite management system 116 detects the entry of the machine 102, 104 based on the machine location data and the machine identification data. The worksite management system 116 monitors the machine 102, 104 in real time by obtaining the machine location data from the respective machine 102, 104.

At step 304, the worksite management system 116 generates the first notification. In order to generate the first notification, the worksite management system 116 obtains the machine identification data and identifies the machine 102, 104 based on the machine identification data. Further, the worksite management system 116 retrieves the maintenance protocols of the machine 102, 104 upon identifying the machine 102, 104. Further, the worksite management system 116 coordinates the predefined parameters and the predefined protocols and generates the first notification. The first notification includes the information related to the service to be performed on the machine 102, 104 at the first predefined area 108. The predefined parameter includes at least one of the type of the machine 102, 104, the type of the service area 106, and the type of the service to be performed on the machine 102, 104.

At step 306, the worksite management system 116 detects the exit of the machine 102, 104 from the first predefined service zone 124 based on the machine location data. The worksite management system 116 also prompts the personnel to enter the information related to the services performed on the machine 102, 104 at any one of the service areas 106.

Further, the worksite management system 116 generates the second notification. The second notification is generated upon the exit of the machine 102, 104 from the first service area 108. The second notification is generated based on the predefined parameters and the maintenance protocols. In one example, the second notification includes the information related to the subsequent service to be performed on the machine 102, 104, based on the service performed at the first service area 108 and the maintenance protocols. The first and second notifications are displayed on the user equipment 128 that is communicably coupled to the worksite management system 116.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for providing notifications related to service information for service of a machine located at a worksite, the method comprising:
    detecting, by a worksite management system, an entry of the machine in a first predefined service zone based on machine location data and machine identification data, wherein the first predefined service zone is defined in the worksite management system corresponding to a first service area at the worksite at which to receive a first service;
    generating, by the worksite management system, a first notification based on at least one predefined parameter and the machine identification data upon the entry of the machine in the first predefined service zone, wherein the first notification includes information related to the first service to be performed at the first service area, and the first service to be performed being to the machine at the first service area; and
    detecting, by the worksite management system, an exit of the machine from the first predefined service zone based on the machine location data.

2. The method of claim 1, wherein a number of predefined service zones are defined in the worksite management system corresponding to a number of service areas at the worksite.

3. The method of claim 1 further comprising prompting, by the worksite management system, a personnel to enter information related to the service performed on the machine at any one of the service areas.

4. The method of claim 1, wherein the step of generating the first notification further comprises:
    identifying the machine based on the machine identification data;
    retrieving one or more maintenance protocols associated with the machine, wherein the one or more maintenance protocols are predefined at the worksite management system; and
    coordinating the at least one predefined parameter and the one or more maintenance protocols associated with the machine to generate the first notification.

5. The method of claim 1 further comprising generating, by the worksite management system, a second notification after detecting the exit of the machine from the first predefined service zone, wherein the second notification includes information related to a subsequent service to be performed on the machine.

6. The method of claim 5, wherein the second notification is generated based on one or more maintenance protocols associated with the machine and the service performed on the machine at the first service area.

7. The method of claim 5 further comprising displaying the first and second notifications on a user equipment communicably coupled to the worksite management system.

8. The method of claim 1, wherein the at least one predefined parameter includes at least one of a type of the machine, a type of the service area and a type of service to be performed on the machine.

9. A system for providing notifications related to service information for service of a machine located at a worksite, the system comprising:
    a worksite management system having a first predefined service zone, wherein the first predefined service zone is defined in the worksite management system corresponding to a first service area at the worksite at which to receive a first service, the worksite management system being configured to:
        detect an entry of the machine in the first predefined service zone based on machine location data and machine identification data;
        generate a first notification upon the entry of the machine in the first predefined service zone, wherein the first notification includes information related to the first service to be performed at the first service area, and the first service to be performed being to the machine at the first service area;
        detect an exit of the machine from the first predefined service zone based on the machine location data; and
        generate a second notification after detecting the exit of the machine from the first predefined service zone, wherein the second notification includes information related to a subsequent service, different from the first service, to be performed to the machine at a second predefined service zone different from the first predetermined service zone; and
    a user equipment communicably coupled to the worksite management system, wherein the user equipment is configured to display the first and second notifications received from the worksite management system.

10. The system of claim 9, wherein a number of predefined service zones are defined in the worksite management system corresponding to a number of service areas at the worksite.

11. The system of claim 9, wherein the worksite management system is configured to prompt a personnel to enter information related to the service performed on the machine at any one of the service areas.

12. The system of claim 9, wherein the worksite management system is configured to:
    identify the machine based on the machine identification data;
    retrieve one or more maintenance protocols associated with the machine, wherein the one or more maintenance protocols are predefined at the worksite management system; and
    coordinate the at least one predefined parameter and the one or more maintenance protocols associated with the machine to generate the first notification.

13. The system of claim 9, wherein the second notification is generated based on one or more maintenance protocols associated with the machine and the service performed on the machine at the first service area.

14. The system of claim 9, wherein the at least one predefined parameter includes at least one of a type of the machine, a type of the service area and a type of service to be performed on the machine.

15. A computer program product embodied in a computer for providing notifications related to service information for service of a machine located at a worksite, the computer program product causing the computer to perform operations comprising:
    detecting, by the worksite management system, an entry of a machine in a first predefined service zone based on machine location data and machine identification data, wherein the first predefined service zone is defined in the worksite management system corresponding to a first service area at the worksite at which to receive a first service;
    generating, by the worksite management system, a first notification based on at least one predefined parameter and the machine identification data upon the entry of the machine in the first predefined service zone, wherein the first notification includes information related to the first service to be performed at the first service area, and the first service to be performed being to the machine at the first service area;
    detecting, by the worksite management system, an exit of the machine from the first predefined service zone based on the machine location data; and
    generating, by the worksite management system, a second notification after detecting the exit of the machine from the first predefined service zone, wherein the second notification includes information related to a subsequent service, different from the first service, to be performed to the machine at a second predefined service zone different from the first predetermined service zone.

16. The computer program product of claim 15, wherein a number of predefined service zones are defined in the worksite management system corresponding to a number of service areas at the worksite.

17. The computer program product of claim 15 further comprising prompting, by the worksite management system, a personnel to enter information related to the service performed on the machine at any one of the service areas.

18. The computer program product of claim 15, wherein the step of generating the first notification further comprises:
    identifying the machine based on the machine identification data;
    retrieving one or more maintenance protocols associated with the machine, wherein the one or more maintenance protocols are predefined at the worksite management system; and
    coordinating the at least one predefined parameter and the one or more maintenance protocols associated with the machine to generate the first notification.

19. The computer program product of claim 15, wherein the second notification is generated based on one or more maintenance protocols associated with the machine and the service performed on the machine at the first service area.

20. The computer program product of claim 15, wherein the at least one predefined parameter includes at least one of a type of the machine, a type of the service area and a type of service to be performed on the machine.

* * * * *